United States Patent [19]

Kanazaki

[11] Patent Number: 5,884,160
[45] Date of Patent: Mar. 16, 1999

[54] MOBILE VOICE MAIL MESSAGE TRANSMISSION SYSTEM

[75] Inventor: Norio Kanazaki, Tokyo, Japan

[73] Assignee: NEC Corporation, Tokyo, Japan

[21] Appl. No.: 703,909

[22] Filed: Aug. 27, 1996

[30] Foreign Application Priority Data

Aug. 28, 1995 [JP] Japan .................................. 7-218513

[51] Int. Cl.[6] .................................................. H04M 1/65
[52] U.S. Cl. .................... 455/413; 379/88.19; 379/88.12
[58] Field of Search .................................. 455/412, 413; 379/67, 68, 69, 88, 89, 211, 212

[56] References Cited

U.S. PATENT DOCUMENTS

| | | | |
|---|---|---|---|
| 5,003,576 | 3/1991 | Helferich | 379/88 |
| 5,109,400 | 4/1992 | Patsiokas et al. | 379/89 |
| 5,172,404 | 12/1992 | Hashimoto | 379/67 |
| 5,313,515 | 5/1994 | Allen et al. | 379/89 |
| 5,418,835 | 5/1995 | Frohman et al. | 379/88 |
| 5,483,578 | 1/1996 | Ackermann et al. | 379/67 |
| 5,586,172 | 12/1996 | Sakurai et al. | 379/67 |
| 5,592,532 | 1/1997 | Koizumi | 455/412 |
| 5,745,551 | 4/1998 | Strauch et al. | 379/87 |

FOREIGN PATENT DOCUMENTS 5-76063   3/1993   Japan .
5-292205  11/1993  Japan .

*Primary Examiner*—Daniel S. Hunter
*Attorney, Agent, or Firm*—Foley & Lardner

[57] ABSTRACT

A mobile voice mail message transmission system includes a voice mail device, an announcement trunk, a message transmitting section, and a message erasing section. The voice mail device temporarily stores voice mail messages from callers in correspondence with called mobile terminals when the mobile terminals are in a communication disabled state. The announcement trunk urges the mobile terminal to receive voice mail messages on the basis of a parameter associated with voice mail messages stored in the voice mail device. In response to a request for reception of voice mail messages from the mobile terminal, the message transmitting section transmits the corresponding voice mail messages stored in the voice mail device to the mobile terminal which has generated the request for reception of the voice mail messages. The message erasing section erases voice mail messages which are stored in the voice mail device and have been transmitted upon completion of transmission of the voice mail messages from the message transmitting section to the mobile terminal which has generated the request for reception of the messages.

3 Claims, 7 Drawing Sheets

MOBILE VOICE MAIL MESSAGE TRANSMISSION SYSTEM

BACKGROUND OF THE INVENTION

The present invention relates to a mobile voice mail message transmission system in which when communication to a mobile terminal cannot be performed as in a case wherein the power supply of the mobile terminal is OFF, voice mail messages are accumulated in another device, and the accumulated voice mail messages are sent to the mobile terminal afterward.

A mobile communication system including mobile communication terminals allows communication in many places within a service area. In addition, even in a disaster such as an earthquake, this system can be easily restored because the system is a radio communication system. Owing to these advantages, such a system has rapidly come into widespread use. A mobile terminal can be carried to any place, but the use of the terminal is sometimes prohibited in a special place, e.g., in a theater or airplane, and when the power supply is turned off. In addition, the terminal may be carried outside the service area. In such a case, communication cannot be performed. In some case, therefore, the mobile terminal returns no response to a call unlike a telephone set fixed in a specific place, such as an indoor location.

Japanese Patent Laid-Open No. 5-76063 discloses a mobile voice mail message transmission system which can send a voice mail to even a mobile terminal in a communication disabled state. In this system, when a called mobile terminal returns no response, a voice mail from the caller is accumulated in a mobile communication switching unit. When the mobile terminal is set in a communication enabled state, the voice mail message is sent from the mobile communication switching unit to the mobile terminal.

FIG. 10 shows a procedure for transmitting a mobile voice mail message in this system in detail. A mobile communication switching unit 4 is connected to a radio base station 2 via a data communication line (not shown). The radio base station 2 is connected to a mobile terminal 1 via a control channel for transmission of radio waves.

When a calling subscriber 21 transmits a call request to the switching unit 4 (step S101), a call signal is transmitted from the switching unit 4 to the radio base station 2 (step S102). The signal is further transmitted from the radio base station 2 to the mobile terminal 1 (step S103). If the mobile terminal 1 is in the communication disabled state at this time, the mobile terminal 1 cannot return a call response to the switching unit 4. The switching unit 4 waits for a call response. If a timeout occurs, a communication line path is switched to an announcement trunk (ANT) 6 (step S104) to announce to the calling subscriber 21 that the called mobile terminal 1 is absent (step S105). At this time, the switching unit 4 notifies the calling subscriber 21 that he/she can request registration of a voice mail in the switching unit 4.

When the calling subscriber 21 has a message to be sent, he/she outputs a voice mail registration request signal to the switching unit 4 (step S106), and sends a voice mail addressed to the mobile terminal 1 to the switching unit 4 (step S107). This voice mail message is accumulated in a voice mail device (VM) 5 of the switching unit 4.

When the power supply of the mobile terminal 1, which has been in the communication disabled state, is turned on or the terminal moves into the service area, the terminal transmits a position registration signal to the radio base station 2 (step S108). The radio base station 2 transmits this position registration signal to the switching unit 4 (step S109). Upon reception of the position registration signal, the switching unit 4 searches for a voice mail message to be transmitted to the mobile terminal 1. If a voice mail message to be transmitted is found, the switching unit 4 sends a voice mail transfer start signal to the radio base station 2 (step S110). The radio base station 2 transmits this signal to the mobile terminal 1 as the transfer destination (step S111). The switching unit 4 extracts the corresponding voice mail message from the voice mail device (VM) 5, encodes the speech signal, and transmits the resultant data to the radio base station 2 (step S112). The radio base station 2 transmits this data to the mobile terminal 1 (step S113).

Upon completion of the transfer of the voice mail message, the switching unit 4 transmits a voice mail transfer end signal to the radio base station 2 (step S114). The radio base station 2 transmits this signal to the mobile terminal 1 as the transfer destination (step S115). Upon completion of the transfer of the voice mail message, the switching unit 4 also erases the voice mail message which has been transmitted and accumulated in the voice mail device (VM) 5. When the transfer of the voice mail message is completed, the mobile terminal 1 performs visible display on a terminating display unit to notify the user of the termination of the voice mail. When the user designates a read operation for the voice mail on the basis of this notification, the coded speech signal accumulated in the mobile terminal 1 is decoded, and the contents of the voice mail are output by speech.

Japanese Patent Laid-Open No. 5-292205 also discloses a mobile voice mail message transmission system. In this system, a communication network itself has a device having an automatic answering function, in which voice mail messages are accumulated. This device, in which voice mail messages are accumulated, automatically performs an originating operation, as needed, to automatically deliver a voice mail, a message board service message, or a message in the automatic answering mode. A mobile terminal can generate an outgoing call to the device by itself to receive a voice mail message.

With such a voice mail service, even if a call is given to a mobile terminal in the communication disabled state, a necessary voice mail message can be received afterward. This voice mail message is stored in a memory of a predetermined device such as a mobile communication switching unit. If, therefore, an unexpected number of users use the voice mail message function very often within the service area of the mobile communication switching unit, the messages to be stored exceed the storage capacity of the memory. As a result, the other users have difficulty in using the voice mail message function.

In the conventional systems, it takes time for the user of a mobile terminal to extract even a highly urgent voice mail message from the memory of a mobile communication switching unit or the like. In addition, assume that the mobile terminal receives a plurality of voice mail messages. In this case, if some voice mail messages are processed for an excessively long period of time, the user cannot hear a highly urgent voice mail message on time.

SUMMARY OF THE INVENTION

It is an object of the present invention to provide a mobile voice mail message transmission system which allows the respective mobile terminals to use a voice mail message service as fairly as possible.

It is another object of the present invention to provide a mobile voice mail message transmission system which allows the user of a mobile terminal to preferentially hear a highly urgent voice mail message.

In order to achieve the above objects, according to the present invention, there is provided a mobile voice mail message transmission system comprising message storage means for temporarily storing voice mail messages from callers in correspondence with called mobile terminals when the mobile terminals are in a communication disabled state, reception urging means for urging the mobile terminal to receive voice mail messages on the basis of a parameter associated with voice mail messages stored in the message storage means, message transmission means for, in response to a request for reception of voice mail messages from the mobile terminal, transmitting the corresponding voice mail messages stored in the message storage means to the mobile terminal which has generated the request for reception of the voice mail messages, and message erasing means for erasing voice mail messages which are stored in the message storage means and have been transmitted upon completion of transmission of the voice mail messages from the message transmission means to the mobile terminal which has generated the request for reception of the messages.

DESCRIPTION OF THE PREFERRED EMBODIMENT

An embodiment of the present invention will be described in detail below with reference to the accompanying drawings.

Figure 1:
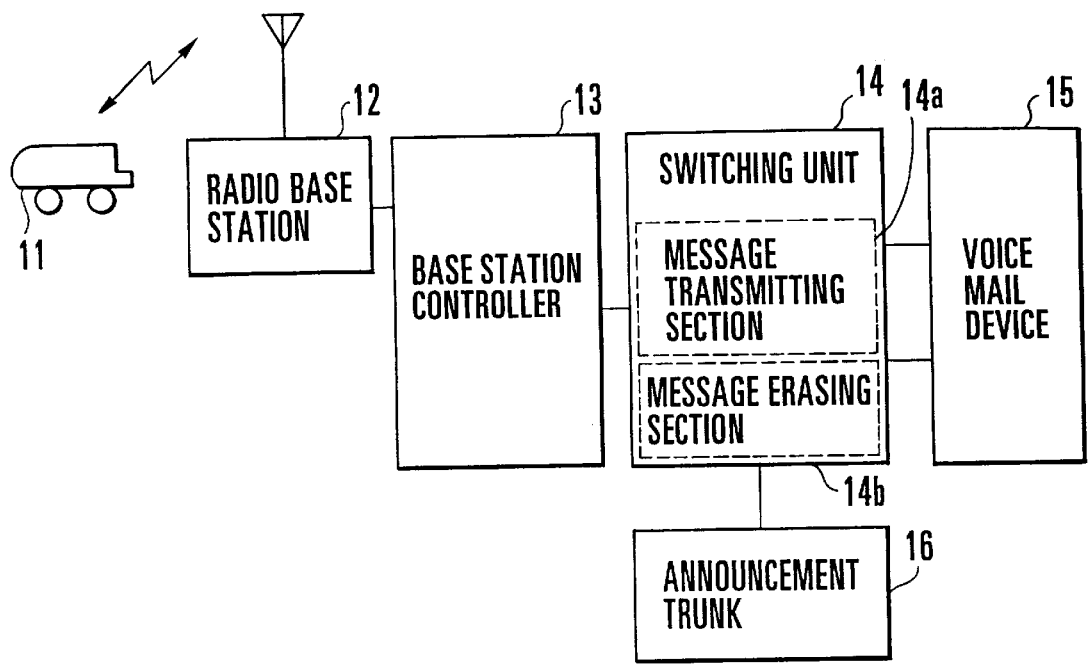
FIG. 1 is a block diagram showing the schematic arrangement of a mobile voice mail message transmission system according to an embodiment of the present invention.

FIG. 1 shows the schematic arrangement of a mobile voice mail message transmission system according to an embodiment of the present invention. In this embodiment, a mobile terminal 11 is a car telephone, which transmits/receives data to/from a radio base station 12 by radio. The radio base station 12 is connected to a car telephone switching unit 14 via a base station controller 13. A voice mail device (mail box) 15 as a message storage means and an announcement trunk 16 as a reception urging means are connected to the switching unit 14. The voice mail device 15 stores a voice mail message from a calling subscriber. The announcement trunk 16 performs speech guidance for the calling subscriber. The switching unit 14 includes a message transmitting section 14a for transmitting a voice mail message stored in the voice mail device 15 to the mobile terminal 11 as a voice mail destination, and a message erasing section 14b for erasing a voice mail message, which has been transmitted, from the voice mail device 15 upon completion of transmission of the voice mail message to the mobile terminal 11 as the destination.

Figure 2:
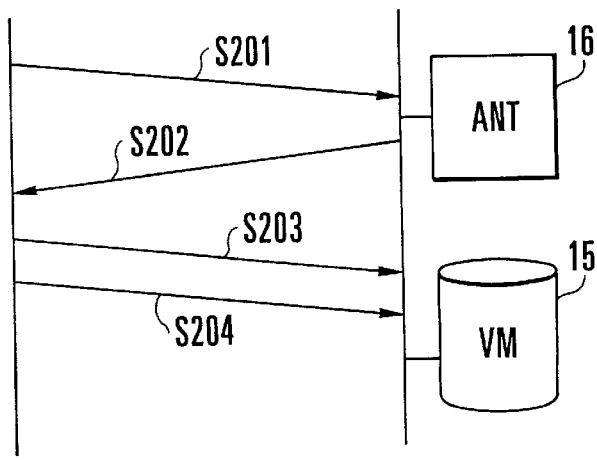
FIG. 2 is a view showing a sequence of signal processing between a calling subscriber and a switching unit up to voice mail message registration in FIG. 1.
Figure 10:
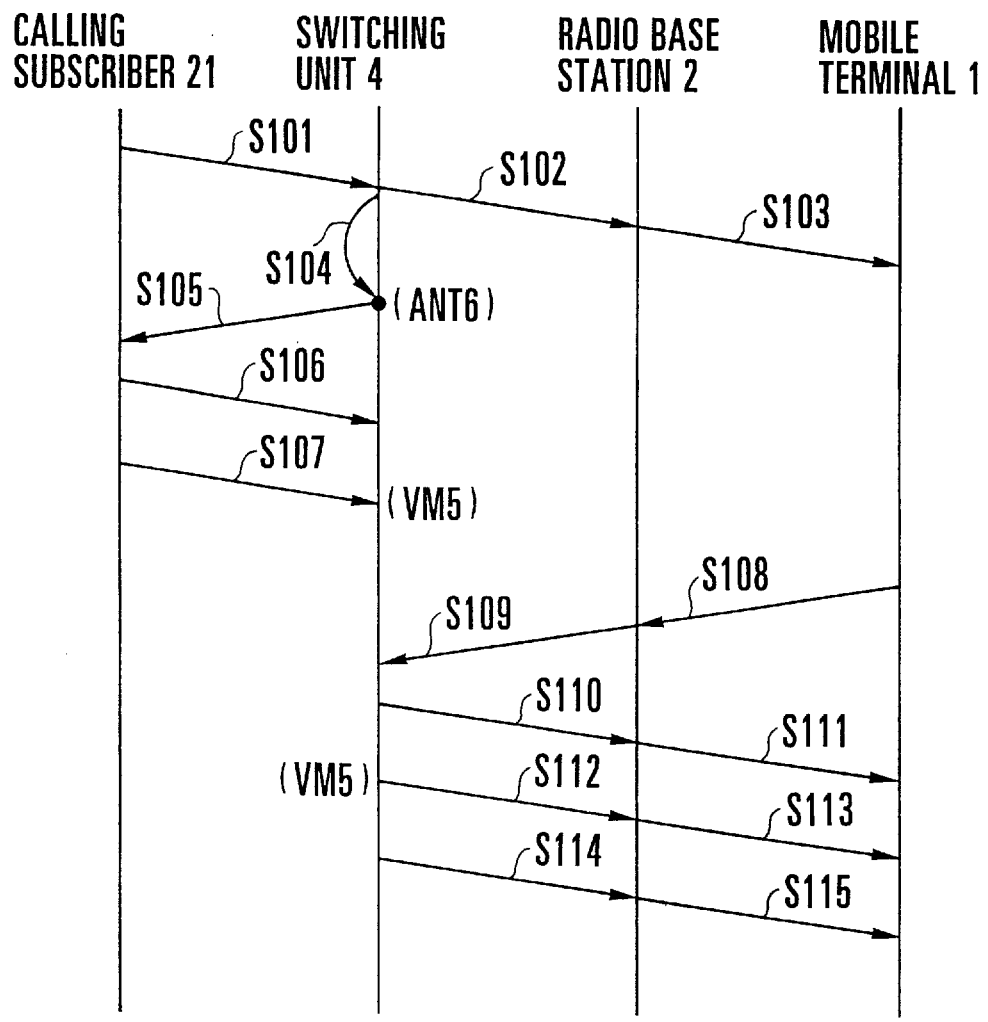
FIG. 10 is a view showing a conventional sequence of transmission of a mobile voice mail message.

FIG. 2 shows an outline of signal processing between a calling subscriber 21 and the switching unit 14 up to voice mail message registration. In this case, FIG. 10 will be partly referred to, and illustration of the radio base station 12 and the mobile terminal 11 will be omitted. When the calling subscriber 21 transmits a call request to the switching unit 14 (step S201), the switching unit 14 monitors a call response from the mobile terminal 11. If the called mobile terminal 11 is busy or is presently outside the service area, or the power supply is OFF, the switching unit 14 causes the announcement trunk (ANT) 16 to announce to the calling subscriber 21 that the called mobile terminal 11 is in the communication disabled state (step S202). At this time, the switching unit 14 notifies the calling subscriber 21 that he/she can request registration of a voice mail. If the calling subscriber 21 requests this registration, the switching unit 14 notifies the calling subscriber 21 that he/she must notify whether the voice mail is an urgent or normal one.

When the calling subscriber 21 has a message to be transmitted, he/she outputs a voice mail registration request signal to the switching unit 14 (step S203), and sends information indicating the presence/absence of a degree of urgency and the voice mail message to the switching unit 14 (step S204). The priority information indicating the presence/absence of a priority and the voice mail message are sent to the voice mail device 15 of the switching unit 14.

Figure 3:
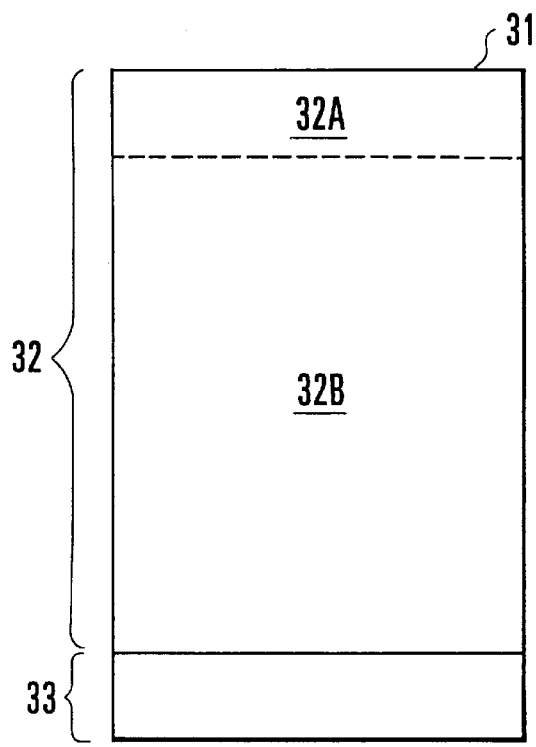
FIG. 3 is a view for explaining the memory configuration of a mail box in FIG. 1.

FIG. 3 shows the memory configuration of the mail box 15. A memory 31 as part of the voice mail device 15 is constituted by two areas, i.e., a normal processing memory area 32 and an urgent processing memory area 33. The normal processing memory area 32 is an area to be assigned when the calling subscriber 21 requests registration processing of a voice mail message for normal processing. The normal processing memory area 32 is constituted by a management area 32A for storing the number of voice mail messages registered for each mobile terminal 11, and a normal processing message storage area 32B for storing voice mail messages.

The urgent processing memory area 33 is an area for storing a voice mail message for which registration processing for urgent processing is requested. In order to prevent the urgent processing memory area 33 from being occupied by non-urgent voice mail messages, a fee is set for registration processing of a voice mail message demanding urgent processing and stored in this area. If registration processing of a voice mail message demanding normal processing is not free, the fee for registration processing for the urgent processing memory area 33 is set to be higher than that for registration processing for the normal processing memory area 32. The number of voice mail messages registered in the urgent processing memory area 33 may be limited for each mobile terminal 11 depending on a system.

In contrast to this, a registration warning count of voice mail messages in the normal processing memory area 32 is set for each mobile terminal 11. The registration warning count is the number of messages at which a warning about registration is generated. A common registration warning count may be set for the respective subscribers, or different registration warning counts may be set in accordance with ranks determined on the basis of usage records, fees, or the like. The management area 32A is used to store the current number of voice mail messages registered for each mobile terminal 11. When this number becomes equal to or larger than the registration warning count, the announcement trunk 16 notifies the corresponding mobile terminal 11 of this information with a speech message or the like, thereby urging the user to hear the accumulated messages at an early stage. With this operation, the memory capacity is saved to allow storage of new voice mail messages.

Figure 4:
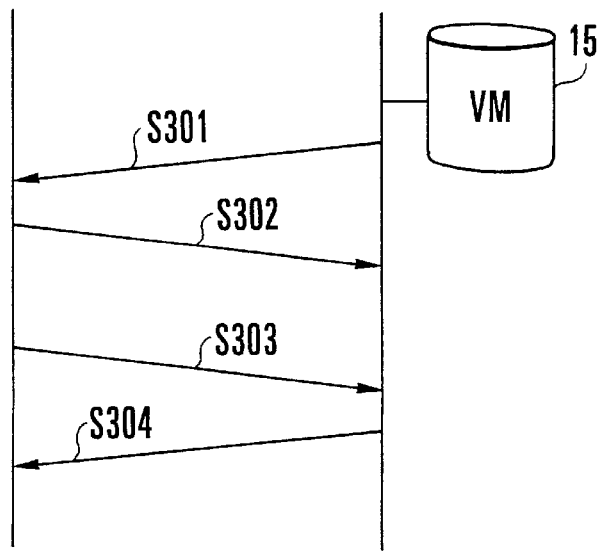
FIG. 4 is a view showing a sequence of signal processing to be performed after voice mail message registration between the switching unit and the mobile terminal in FIG. 1.

FIG. 4 shows an outline of signal processing after voice mail message registration between the switching unit 14, to which the voice mail device 15 is connected, and the mobile terminal 11. In FIG. 4, illustration of the radio base station 12 and the calling subscriber 21 is omitted. On the switching unit 14 side, the memory 31 of the voice mail device 15 described with reference to FIG. 3 is periodically searched. Calls are made to the subscribers of the mobile terminal 11 corresponding to the number of voice mail messages demanding normal processing and registered in the management area 32A of the normal processing memory area 32 which has reached the corresponding registration warning count, and the mobile terminal 11 for which a voice mail message demanding urgent processing is stored in the urgent processing memory area 33 (step S301). In calling each subscriber, information indicating the presence/absence of a voice mail message for urgent processing is also transmitted. If the mobile terminal 11 is kept in the communication disabled state, this calling operation is periodically repeated until the terminal is set in the communication enabled state.

If the called mobile terminal 11 is in the communication enabled state, a response signal is generated (step S302). At this time, the mobile terminal 11 displays information indicating that voice mail messages are accumulated on the switching unit 14 side, or information indicating that a voice mail message demanding urgent processing is present if it is stored in the switching unit 14. The mobile terminal 11 sends a voice mail connection request to the switching unit 14 at a desired timing at which the user wants to hear a voice mail message (step S303). This request may be a request to hear a voice mail message demanding urgent processing or a request to sequentially hear all voice mail messages from a voice mail message demanding urgent processing.

Upon reception of the voice mail connection request, the message transmitting section 14a of the switching unit 14 extracts a voice mail message associated with the mobile terminal 11, which has sent the request, from the voice mail device (VM) 15, and transmits it to the mobile terminal 11 (step S304). If the request is for a voice mail message demanding urgent processing, only the voice mail message demanding urgent processing is transmitted to the mobile terminal 11. The user of the mobile terminal 11 then can hear the voice mail message during the transmission. Every time transmission of a voice mail message as a unit is completed, the message erasing section 14b erases the compressed data of the corresponding voice mail message from the memory 31 of the voice mail device 15 in FIG. 3. When a voice mail message demanding normal processing is erased, the number of voice mail messages registered for the mobile terminal 11 which is registered in the management area 32A is decreased accordingly. When all the voice mail messages are transmitted, this number is cleared to 0.

Figure 5:
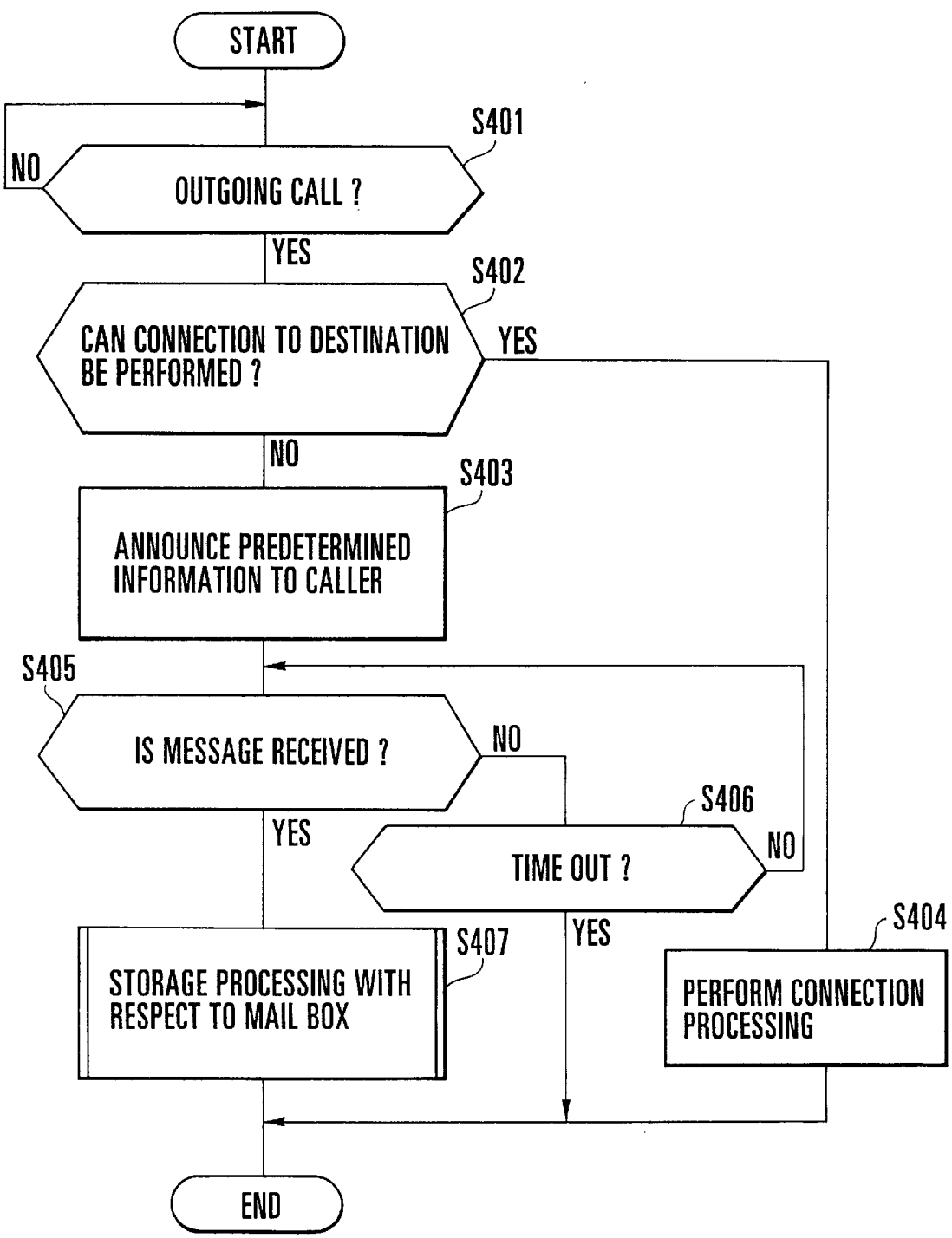
FIG. 5 is a flow chart showing the main part of the processing performed by the switching unit in FIG. 1.

FIG. 5 shows the main part of the flow of processing performed by the switching unit 14. The switching unit 14 includes a CPU (central processing unit) (not shown), and performs the following control processing including control operations for the message transmitting section 14a and the message erasing section 14b on the basis of programs stored in a storage device such as a hard disk (not shown).

Upon detection of the outgoing call from the calling subscriber 21, which is generated in step S210 in FIG. 2, (step S401), the switching unit 14 checks whether connection to the terminating destination (mobile terminal 11) can be made (step S402). If the connection cannot be made as in a case wherein the power supply of the mobile terminal 11 as the terminating destination is OFF or the mobile terminal 11 is outside the service area, the switching unit 14 announces to the calling subscriber 21 that a voice mail message cannot be transmitted (step S403). In contrast to this, if it is determined in step S402 that the connection to the terminating destination can be made, normal connection processing is performed (step S404).

After the switching unit 14 makes the above announcement to the calling subscriber 21 in step S403, the flow waits to check whether a voice mail message is received within a predetermined period of time (steps S405 and S406). If it is determined in step S406 that the calling subscriber 21 does not send a voice mail message within the predetermined period of time, the processing is completed. If it is determined in step S405 that a voice mail message is sent, storage processing (to be described next) is performed with respect to the mail box 15 (step S407).

Figure 6:
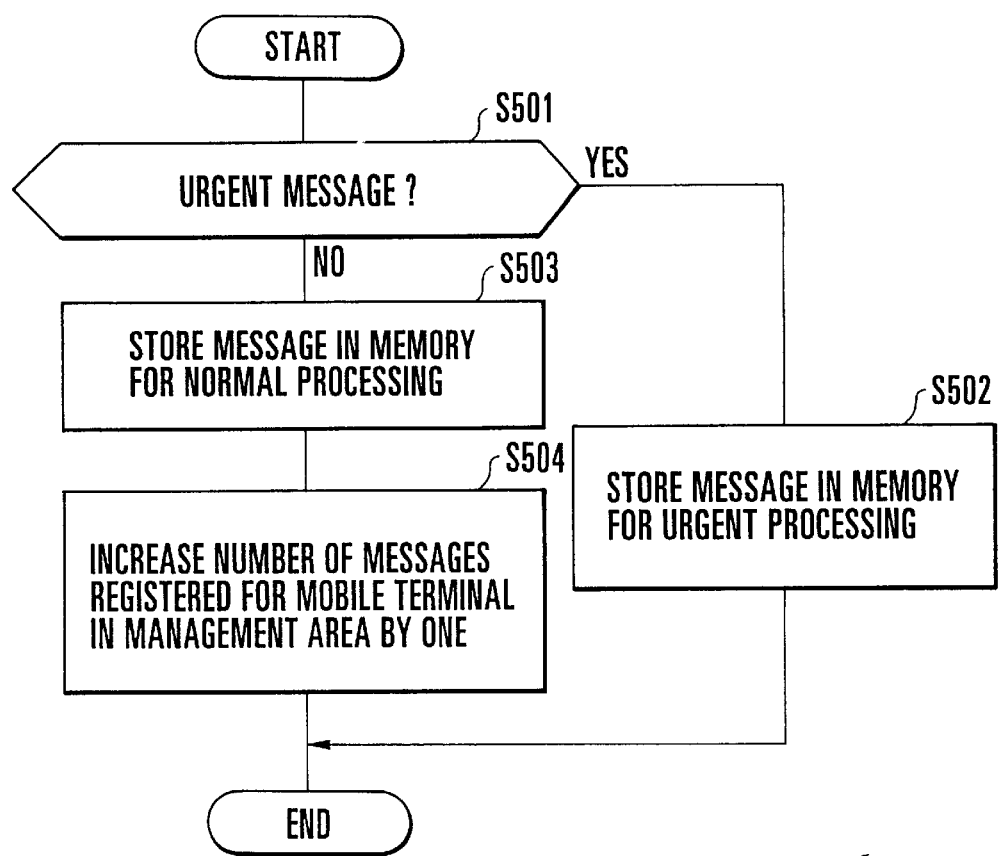
FIG. 6 is a flow chart showing storage processing for the mail box in FIG. 1 in detail.

FIG. 6 shows the storage processing with respect to the mail box 15 in detail. The switching unit 14 decodes the data located at the start portion of the voice mail message sent from the calling subscriber 21 and checks whether the message is a voice mail message demanding urgent processing (step S501). If YES in step S501, this message is stored in the urgent processing memory area 33 of the memory 31 in FIG. 3 (step S502).

If it is determined in step S501 that the message is a voice mail message demanding normal processing, the message is stored in the normal processing message storage area 32B of the memory 31 (step S503). The number of voice mail messages registered for the mobile terminal 11 which corresponds to the management area 32A is increased by "1" (step S504).

Figure 7:
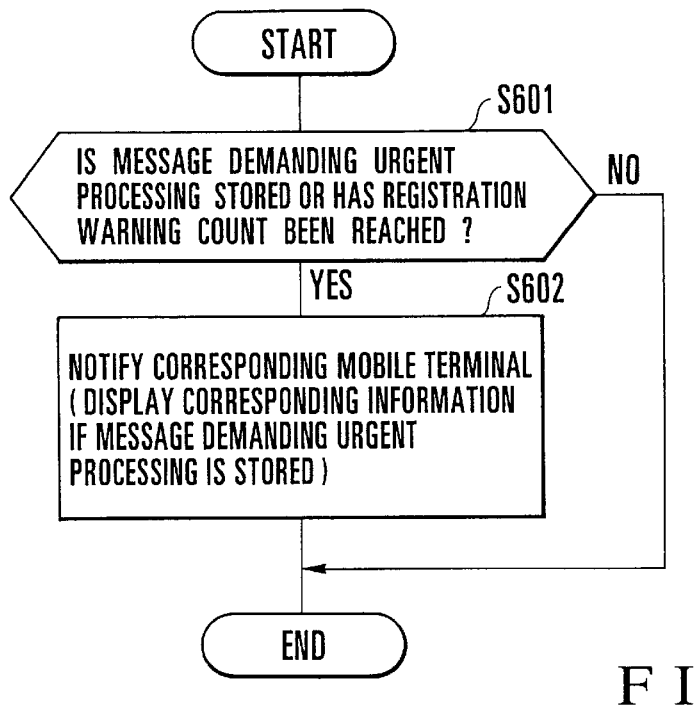
FIG. 7 is a flow chart showing how the switching unit in FIG. 1 performs control associated with notification for one of mobile terminals which satisfies a predetermined condition.

FIG. 7 shows how the switching unit 14 performs control associated with notification performed with respect to one of the mobile terminals 11 which satisfies a predetermined condition. The switching unit 14 searches the memory 31 of the voice mail device 15 in FIG. 2 at predetermined time intervals to check whether a voice mail message demanding urgent processing is present or there is any mobile terminal 11 for which the number of voice mail messages stored has reached the registration warning count (step S601). If the corresponding mobile terminal 11 is present, the notification processing (subscriber calling operation) in step S301 is performed for the mobile terminal 11 (step S602). In this case, if there is the mobile terminal 11 for which a voice mail message demanding urgent processing is present, corresponding information is displayed.

Figure 8:
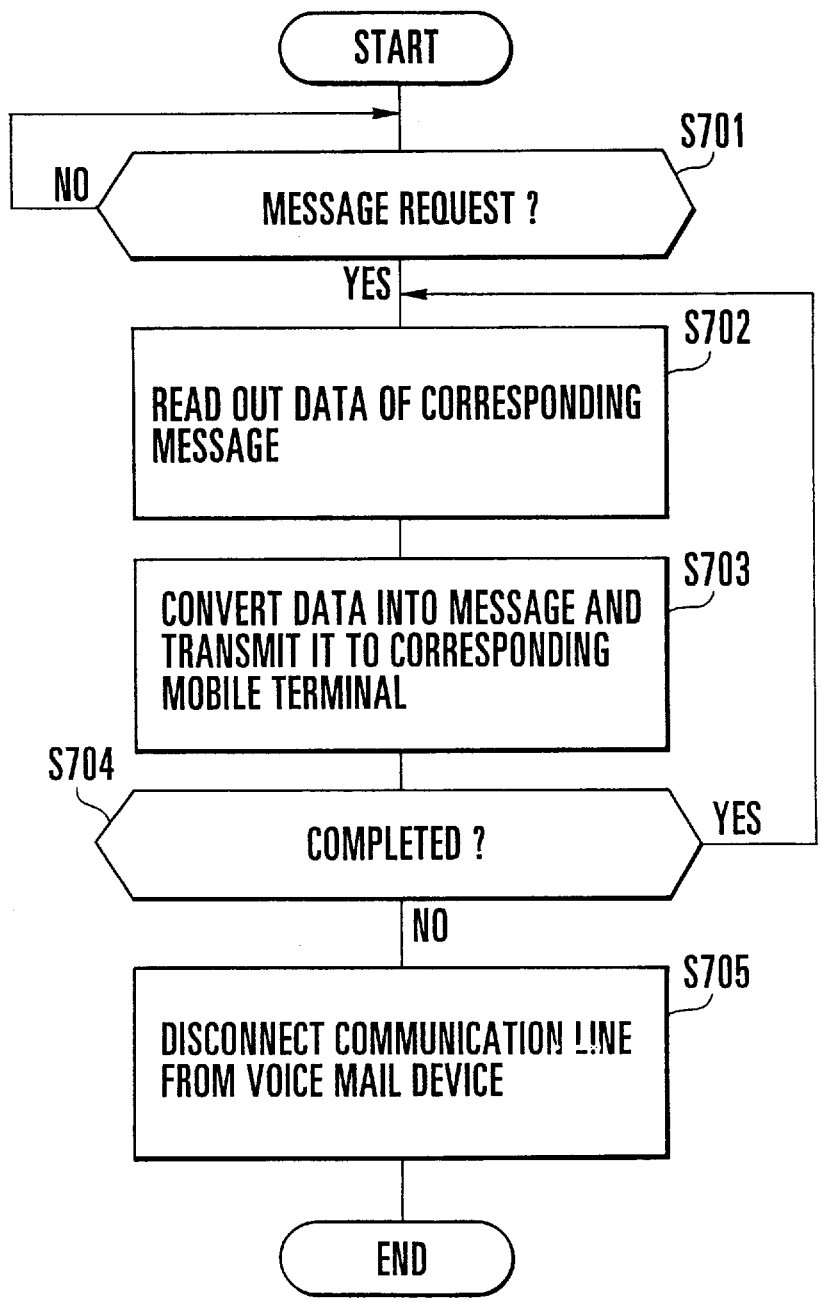
FIG. 8 is a flow chart showing a control sequence in a case wherein the mobile terminal in FIG. 1 requests a voice mail message in response to the notification in FIG. 7.

FIG. 8 shows the flow of control in a case wherein the mobile terminal 11 generates a request for a voice mail message in response to the notification processing in FIG. 7. Upon reception of the request for the voice mail message from the mobile terminal 11 (step S701), the message transmitting section 14a of the switching unit 14 reads out the data of the corresponding voice mail message from the memory 31 of the voice mail device 15 (step S702). This data is then converted into a voice mail message which can be heard as speech, and the message is transmitted to the mobile terminal 11 (step S703). When a plurality of voice mail messages are to be transmitted to the mobile terminal 11, the same operation as described above is repeated until all the voice mail messages are transmitted (step S704). If it is determined in step S704 that transmission of the voice mail message to the mobile terminal 11, which has generated the request for the voice mail message is completed, the voice mail message which has been transmitted is erased from the voice mail device 15 (step S705), and the control processing is terminated.

Figure 9:
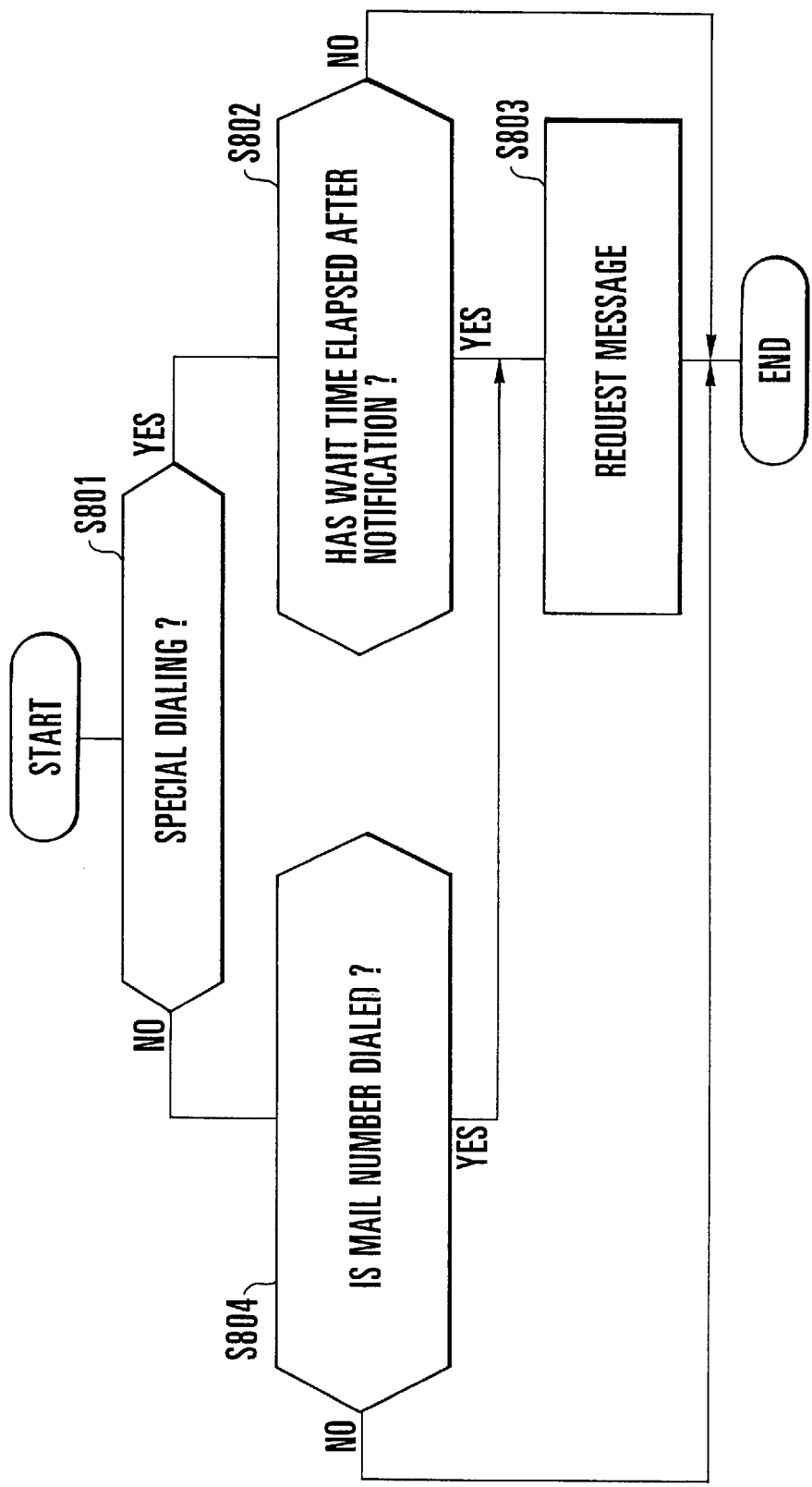
FIG. 9 is a flow chart showing a procedure for requesting a voice mail message on the mobile terminal side in FIG. 1.

FIG. 9 shows a procedure by which the mobile terminal 11 generates a request for a voice mail message. The mobile terminal 11 also includes a CPU (not shown) and a recording medium (not shown) for storing programs for controlling the CPU. When the subscriber of the mobile terminal 11 selects a predetermined special dial number (step S801), the CPU checks whether a predetermined wait time has elapsed since the notification processing was performed in step S602 in FIG. 7 (step S802). If YES in step S802, the CPU generates a request for a voice mail message to cause the switching unit 14 to immediately transmit the corresponding voice mail message (step S803). In this case, if the switching unit 14 keeps holding the line without disconnecting it during the wait time defined in step S802 or a predetermined short time counted by the switching unit 14, the mobile terminal 11 can generate a request for transmission of a voice mail message without generating any outgoing call by selecting a special dial number within the above time. If NO in step S802, selection of the special dial number is neglected, and a request for a voice mail message is not generated.

The subscriber of the mobile terminal 11 may request to hear a voice mail message at a desired time point at which a given period of time has elapsed since it was determined in step S602 that the notification processing was performed as in a case wherein the subscriber has finished another urgent matter. In such a case, the subscriber dials the voice mail box number instead of selecting the special dial number (steps S801 and S804). In this case as well, the switching unit 14 transmits the corresponding voice mail message to the mobile terminal 11 (step S803).

In the above embodiment, when the number of voice mail messages demanding normal processing and registered with respect to the mobile terminal 11 in the communication disabled state becomes equal to or larger than a predetermined count, a warning is generated for the mobile terminal 11. However, the total capacity for voice mail messages may be checked instead of the number of voice mail messages, and a warning may be generated when the memory area used for the mobile terminal 11 exceeds a predetermined value.

In the above embodiment, even if a warning is generated in this manner, the calling subscriber 21 is informed of the possibility of registration of a voice mail message. If the subscriber shows his/her will to register the voice mail message, the message is registered in the memory 31 of the voice mail device 15 unconditionally. With this operation, a voice mail message can be conveniently registered. However, the subscriber of the mobile terminal 11 who has left the terminal in the communication disabled state unfairly occupies the memory 31 as compared with other subscribers. For this reason, the upper limit to which each mobile terminal 11 can use the memory 31 is determined. If this upper limit is exceeded, the switching unit 14 may make an announcement in step S403 in FIG. 5 to notify that a voice mail message other than one demanding urgent processing cannot be registered, thereby inhibiting registration of a voice mail message demanding normal processing.

In the above embodiment, the message storage area of the memory 31 in FIG. 3 is divided into the normal processing memory area 32 and the urgent processing memory area 33. However, this area may not be divided, and each voice mail message may be stored together with data indicating whether the message demands urgent processing.

In the above embodiment, the switching unit 14 searches the memory 31 of the voice mail device 15 at predetermined time intervals to check whether a voice mail message demanding urgent processing is present or there is any one of the mobile terminals 11 for which the number of voice mail messages stored has reached a registration warning count. However, every time a voice mail message is received from the mobile terminal 11, the switching unit 14 may check the presence of such a voice mail message, and may perform such notification to all the corresponding mobile terminals 11.

In the above embodiment, the mobile voice mail message transmission system is given withrespect to a car telephone system. As is apparent, however, the present invention can be applied to other types of mobile terminals.

As has been described above, according to the present invention, since a reception request is sent to a mobile terminal for which the number of voice mail messages stored or a message capacity is large, a ratio at which such mobile terminal leaves voice mail messages stored decreases. Accordingly, each mobile terminal can receive a voice mail message service. Since the subscriber of each mobile terminal need not inquire about the stored state of messages, unnecessary communications can be prevented. In addition, even if the number of messages is small, the subscriber is urged to receive messages when the total capacity is large. With this operation, the respective mobile terminals can use the total capacity of the voice mail message storage means as fairly as possible.

Furthermore, since a request for reception of voice mail messages is repeatedly generated, the load on the mobile terminal side decreases. In addition, since the number of voice mail messages stored or the storage capacity is recognized on the switching unit side, subscribers can be urged to receive voice mail messages in the form that allows storage of voice mail messages as fairly as possible between the mobile terminals.

Assume that an urgent message is stored. In this case, even if the number of voice mail messages stored is one for each mobile terminal, the terminal can preferentially receive the message.

Moreover, a subscriber can receive a voice mail message by performing a special dialing operation immediately after the subscriber is urged to receive the voice mail message. Therefore, each subscriber can quickly hear the contents of an urgent message, in particular, and immediately perform a corresponding process as compared with a case wherein each subscriber hear the contents of an urgent message by a re-dialing operation.

What is claimed is:

1. A mobile voice mail message transmission system comprising:

message storing means for temporarily storing voice mail messages from callers in correspondence with called mobile terminals when said called mobile terminals are in a communication disabled state;

reception notifying means for notifying at least one of said called mobile terminals to receive voice mail messages on the basis of a parameter associated with voice mail messages stored in said message storing means that are destined for said at least one of said called mobile terminals;

message transmission means for, in response to a request for reception of voice mail messages from said at least one of said called mobile terminals, transmitting the corresponding voice mail messages stored in said message storage means to said at least one of said called mobile terminals which has generated the request for reception of the voice mail messages; and message erasing means for erasing voice mail messages, which are stored in said message storage means and have been transmitted, upon completion of transmission of the voice mail messages from said message transmission means to said at least one of said called mobile terminals which has generated the request for reception of the voice mail messages, wherein said message storage means comprises a memory having a first memory area for storing messages demanding normal processing and a second memory area for storing messages demanding urgent processing, and said reception notifying means notifies said at least one of said called mobile terminals to receive voice mail messages on the basis of the parameter associated with voice mail messages, wherein voice mail messages for all of said plurality of mobile terminals are stored in said first and second memory areas, wherein if said at least one of said mobile terminals has a number of voice mail messages stored in the first and second memory areas that exceeds a predetermined number, any further normal voice mail messages demanding normal processing that are addressed to said at least one of said mobile terminals are not stored in the first memory area but rather are discarded, until a time when said at least one of said mobile terminals retrieves said corresponding stored messages addressed to said at least one of said mobile terminals, and wherein a particular voice mail message demanding urgent processing requires one of said callers to pay a fee to have said particular voice mail message stored in the second memory area and to have said at least one of said mobile terminals immediately notified of said particular voice mail message.

2. A voice mail message method for a mobile communications system, comprising the steps of:

a) temporarily storing, by a switching center, voice mail messages from callers in correspondence with called mobile terminals when said called mobile terminals are in a communication disabled state;

b) notifying, by said switching center, at least one of said called mobile terminals to receive voice mail messages on the basis of a parameter associated with said stored voice mail messages;

c) transmitting, by said at least one of said called mobile terminals in response to the notification received in the step b), a request for reception of voice mail messages;

d) transmitting, by said switching center in response to reception of the request for reception of voice mail messages, the corresponding voice mail messages to said at least one of said called mobile terminals, wherein the step c) comprises the substeps of:

c1) determining, by said at least one of said mobile terminals, whether a fixed dialing number has been dialed by a user of said at least one of said mobile terminals in response to reception of the notification received in the step b), the fixed dialing number being used to obtain the corresponding voice mail messages, and if the determination is that the fixed dialing number has been dialed, performing the following substeps:

c2) determining, by said at least one of said mobile terminals, if a fixed time period has elapsed between the reception of the notification received in the step b) and the dialing of the fixed dialing number in the step c1);

c3) if the fixed time period has elapsed, generating and transmitting, by said at least one of said mobile terminals, the request for reception of voice mail messages; and c4) if the fixed time period has not elapsed, ignoring the dialing of the fixed dialing number by said at least one of said mobile terminals, and not generating and not transmitting the request for reception of voice mail messages.

3. The voice mail message method according to claim 2, wherein, if the determination in the substep c1) is that the fixed dialing number has not been dialed, performing the following substeps:

c5) determining, by said at least one of said mobile terminals, whether a mail box number has been dialed by the user in response to reception of the notification received in the step b);

c6) if the determination in the substep c5) is that the mail box number has been dialed, generating and transmitting, by said at least one of said mobile terminals, the request for reception of voice mail messages, the request for reception of voice mail messages being made irrespective as to a time difference between when the mail box number was dialed and when the notification was received in the step b).

* * * * *